(12) United States Patent
Li et al.

(10) Patent No.: US 9,591,139 B2
(45) Date of Patent: Mar. 7, 2017

(54) SYSTEMS, METHODS, AND COMPUTER PROGRAM PRODUCTS FOR PROVIDING CALLER IDENTITY UPDATE INFORMATION

(71) Applicant: GENBAND US LLC, Frisco, TX (US)

(72) Inventors: Xuewen Li, Cary, NC (US); Mario Brown, Apex, NC (US)

(73) Assignee: Genband US LLC, Plano, TX (US)

( * ) Notice: Subject to any disclaimer, the term of this patent is extended or adjusted under 35 U.S.C. 154(b) by 231 days.

(21) Appl. No.: 14/258,930

(22) Filed: Apr. 22, 2014

(65) Prior Publication Data

US 2015/0304499 A1     Oct. 22, 2015

(51) Int. Cl.

| | | |
|---|---|---|
| *H04M 3/54* | (2006.01) | |
| *H04L 29/06* | (2006.01) | |
| *H04M 3/02* | (2006.01) | |
| *H04M 3/22* | (2006.01) | |
| *H04M 3/42* | (2006.01) | |
| *H04M 3/58* | (2006.01) | |

(52) U.S. Cl.
CPC .............. *H04M 3/54* (2013.01); *H04L 65/00* (2013.01); *H04L 65/1006* (2013.01); *H04M 3/02* (2013.01); *H04M 3/2218* (2013.01); *H04M 3/42195* (2013.01); *H04M 3/541* (2013.01); *H04M 3/58* (2013.01)

(58) Field of Classification Search
None
See application file for complete search history.

(56) References Cited

U.S. PATENT DOCUMENTS

| | | | |
|---|---|---|---|
| 8,983,440 B1 * | 3/2015 | Saylor | H04W 4/16 455/415 |
| 2003/0177099 A1 | 9/2003 | Gallant et al. | |
| 2010/0246447 A1 * | 9/2010 | Hoffmann | H04L 63/30 370/259 |
| 2013/0003956 A1 | 1/2013 | Paiement et al. | |

OTHER PUBLICATIONS

EPO, Application No. 15164559.5, Extended Search Report, dated Sep. 21, 2015, 7 pages.

* cited by examiner

*Primary Examiner* — Harry S Hong
(74) *Attorney, Agent, or Firm* — Haynes and Boone, LLP (57) ABSTRACT

A method includes establishing a first call from a first party to a second party; during a ringing status of the first call, cancelling the first call in response to an indication that the first party wishes to transfer the first call; and establishing a second call from a third party to the second party, where a message to establish the second call includes information identifying the third party.

18 Claims, 6 Drawing Sheets

SYSTEMS, METHODS, AND COMPUTER PROGRAM PRODUCTS FOR PROVIDING CALLER IDENTITY UPDATE INFORMATION

TECHNICAL FIELD

The present description relates, in general, to telecommunications and, more specifically, to techniques for updating calling party information during communication session transfers.

BACKGROUND

Calling Line Identification (CLI, often referred to as "Caller ID") for basic call scenarios is well defined in standards and has been deployed successfully all over the world for both traditional telephone lines (sometimes referred to as POTS or Time Division Multiplexing—TDM—lines) and Session Initiation Protocol (SIP) lines. For traditional telephone lines, both basic calls and featured calls support CLI seamlessly. For a hybrid network where both traditional telephone lines and SIP lines coexist, CLI support has been very problematic and not fully supported in some cases. This presents a dissatisfaction to carriers who are trying to modernize the network by gradually migrating traditional telephone lines to SIP lines. End users who have used traditional phones for years are accustomed to correct CLI displays and may be hesitant to accept a service offering with missing or incorrect CLI displays. This problem hence can become an impediment to Class 5 network transformation as well.

As a concrete example, consider three end users—A, B, and C. CLI display update is not fully supported for call transfer scenarios when the A party is at a traditional telephone endpoint (line or trunk) and the B and C parties are SIP lines. Consider the following use case. A (a traditional telephone line) calls B (a SIP line), B transfers the call to C by putting the A-B call on hold and then dialing the C party and completing the transfer when the C party is ringing. In this scenario, the C party sees B' CLI information. But ideally the C party display should change from displaying the B party's CLI information to displaying the A party's CLI information once the transfer is completed and the B party is out of the call. Displaying the A party's CLI information would provide accurate information on who is on the other end of the line if C answers the phone. It directly affects the end user's perception of the quality of the service offering, but is not currently supported consistently or comprehensively.

There are mechanisms proposed prior to this disclosure but these mechanisms do not solve the real world problem of CLI display for featured scenarios like call transfer in a hybrid environment where both TDM endpoints and SIP endpoints coexist. One such mechanism is to use the end-to-end SIP REFER method. This method works only if the A party supports the SIP REFER method and is able to send an INVITE with REPLACES header towards C. However, traditional telephone endpoints do not understand the SIP REFER method. In addition, INVITE with REPLACES is intended to be applicable for DIALOGs initiated by the served endpoint which is not the case for the transferee. Hence this mechanism is not applicable when one or more of the endpoints is a traditional telephone. Another option is to use SIP RFC 4916 to update the displays of the endpoints with correct CLI information. However, most phones do not support RFC 4916, hence this method is not practical for real world deployment.

BRIEF DESCRIPTION OF THE DRAWINGS

The present disclosure is best understood from the following detailed description when read with the accompanying figures.

SUMMARY

According to one embodiment, a method is disclosed that includes establishing a first call from a first party to a second party; during a ringing status of the first call, cancelling the first call in response to an indication that the first party wishes to transfer the first call; and establishing a second call from a third party to the second party, where a message to establish the second call includes information identifying the third party.

According to another embodiment, a system is disclosed that has a network switch with memory storing instructions and a processor unit executing the stored instructions to perform a process including: establishing a first call from a first party to a second party; during a ringing status of the first call, cancelling the first call in response to an indication that the first party wishes to transfer the first call; and establishing a second call from a third party to the second party, where a message to establish the second call includes information identifying the third party.

According to another embodiment, a computer program product is disclosed having a computer readable medium tangibly recording computer program logic for network switching, the computer program product including: code to establish a first call from a first party to a second party; code to, during a ringing status of the first call, cancel the first call in response to an indication that the first party wishes to transfer the first call; and code to establish a second call from a third party to the second party, where a message to establish the second call includes information identifying the third party.

According to one embodiment, a method is disclosed including establishing a first call from a first party to a second party; as the first call is ongoing, sending a message to the second party changing a calling party indicator from the first party to a third party, wherein sending the message is performed in response to an indication that the first party wishes to transfer a second call with the third party; and establishing communications between the third party and the second party in the first call.

According to one embodiment, a system is disclosed having a network switch with memory storing instructions and a processor unit executing the stored instructions to perform a process including: establishing a first call from a first party to a second party; as the first call is ongoing, sending a message to the second party changing a calling party indicator from the first party to a third party, wherein sending the message is performed in response to an indication that the first party wishes to transfer a second call with the third party; and establishing communications between the third party and the second party in the first call.

According to one embodiment, a computer program product is disclosed having a computer readable medium tangibly recording computer program logic for network switching, the computer program product including: code to establish a first call from a first party to a second party; code to, as the first call is ongoing, sending a message to the second party changing a calling party indicator from the first party to a third party, wherein sending the message is performed in response to an indication that the first party wishes to transfer a second call with the third party; and code to establish communications between the third party and the second party in the first call.

According to one embodiment, a method is disclosed including establishing a first call from a first party to a second party; receiving an indication that the second party wishes to transfer communication to a third party; in response to the indication that the second party wishes to transfer communications, sending a message from a switch to the third party to initiate a second call from the first party to the third party; and establishing the second call from the first party to the third party.

According to one embodiment, a system is disclosed, the system having a network switch with memory storing instructions and a processor unit executing the stored instructions to perform a process including: establishing a first call from a first party to a second party; receiving an indication that the second party wishes to transfer communication to a third party; in response to the indication that the second party wishes to transfer communications, sending a message from a switch to the third party to initiate a second call from the first party to the third party; and establishing the second call from the first party to the third party.

According to another embodiment, a computer program product is disclosed having a computer readable medium tangibly recording computer program logic for network switching, the computer program product including: code to establish a first call from a first party to a second party; code to receive an indication that the second party wishes to transfer communication to a third party; code to, in response to the indication that the second party wishes to transfer communications, send a message from a switch to the third party to initiate a second call from the first party to the third party; and code to establish the second call from the first party to the third party.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Various embodiments provide techniques for updating a calling party's CLI information during a call transfer. Various embodiments disclosed herein are applicable to architectures where at least one endpoint is a Voice over Internet Protocol (VoIP) endpoint, such as a SIP terminal. However, various embodiments are especially applicable to architectures wherein at least one endpoint is a VoIP endpoint and at least one other endpoint is a traditional telephone endpoint. However, various embodiments are also applicable to architectures in which all endpoints are VoIP endpoints.

The techniques described herein may be used to provide the advantage of displaying calling party A's CLI information on a display of user C when user B transfers an A-B call to user C. Thus, while conventional approaches would typically provide the CLI information of user B at user C's display, various embodiments disclosed herein may be used to provide user A's information to user C as the call is transferred.

The disclosure below focuses on three different call-transfer scenarios (though the scope of embodiments is not limited only to those three scenarios). In a single step transfer, party A calls party B. Party B answers the call. Party B's SIP phone includes a user interface to transfer an active call to party C in a single step, e.g., by pressing a "transfer" button and specifying party C's address (e.g., a SIP address or a conventional telephone number). Once party C's address is completed, then the party B's SIP phone sends one message (REFER) with party C's address to a switch in a telecommunications network. Party B is automatically released without hearing the C party ringing. Party A is then connected to Party C.

According to some embodiments, in a single step transfer scenario, the switch would initiate a call from user A to user C upon receiving an indication that user B wishes to transfer the A-B call to user C. The newly initiated call from A to C would include A's CLI information in the call set-up information.

In another scenario, referred to as a blind transfer (or multi-step blind transfer), party A calls party B. B answers the call and puts party A on hold. Party B then dials the party C's telephone number (also referred to as a Directory Number or DN). Party B hears the audible ring back tones indicating party C has been alerted. Then party B requests the transfer of A to C. In this case, party B first dials the party C and then requests the transfer of A to C. It is a two-step process. Party B transfers the call before C answers the call.

According to some embodiments, in a blind transfer, a switch cancels the first call during the ringing status of the first call in response to the party B's transfer request. The switch then establishes a second call from party A to party C, where the second call set-up information includes party A's CLI information.

In yet another scenario, which may be referred to as a consultative transfer, party B uses the same steps of the blind transfer, except that party B waits for party C to answer before transferring the call to party C. In this scenario, the switch completes the transfer by sending an initiating signal to party C in which the switch has replaced party B's CLI information with party A's CLI information.

Figure 1:
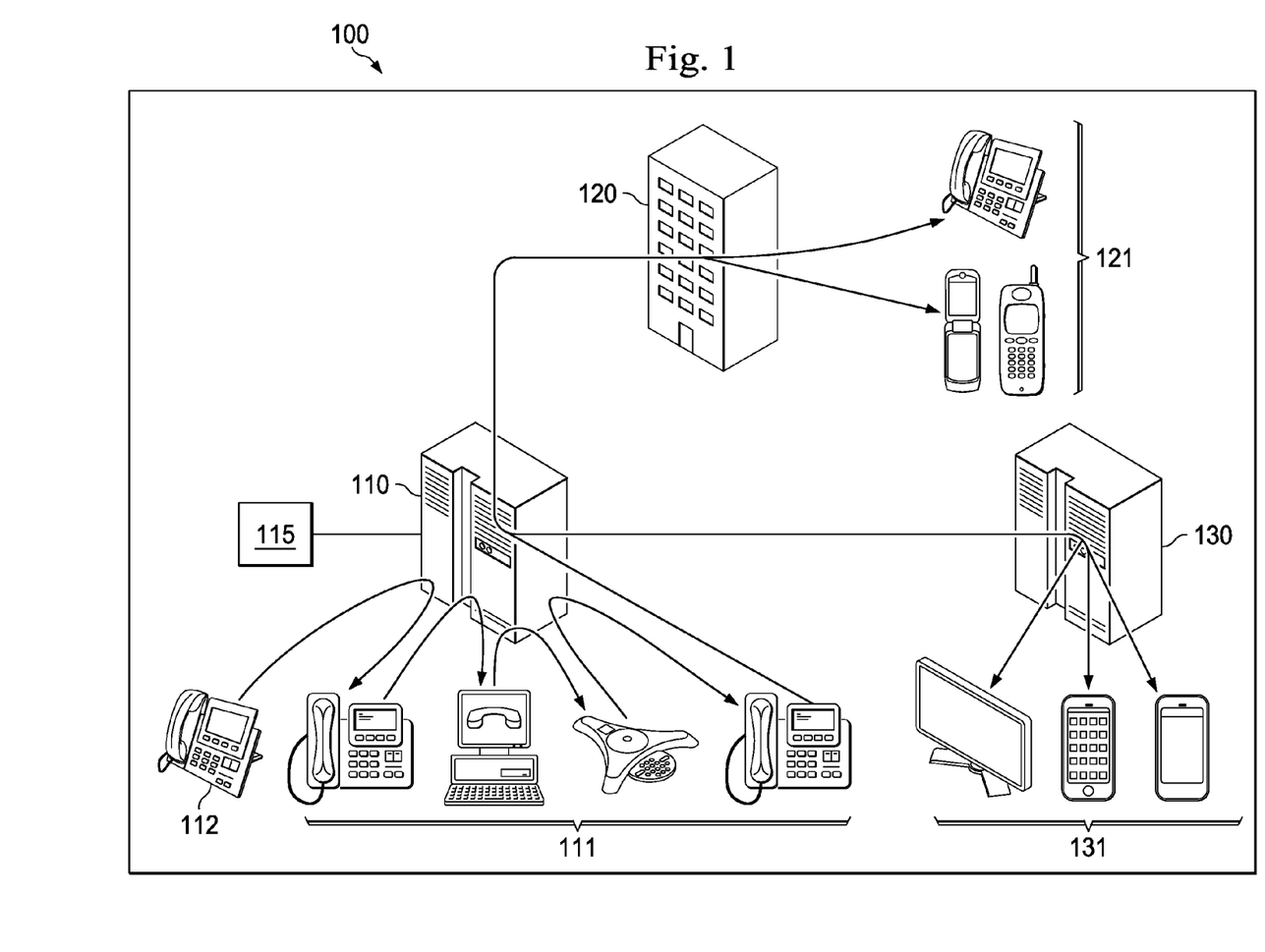
FIG. 1 is an illustration of an exemplary network architecture, adapted according to one embodiment.

FIG. 1 is an illustration of exemplary network architecture 100, adapted according to one embodiment. Architecture 100 includes switch 110, which has an transfer module 115.

Transfer module 111 runs an algorithm to transfer calls according to the scenarios mentioned above.

Switch 110 in this example is part of a hybrid Time Division Multiplexing (TDM) and Internet Protocol (IP) class 5 network. For instance, telephone 112 is a conventional, analog telephone in this example, and it is adapted communicate with a switch of a Plain Old Telephone Service (POTS) network. Additionally, devices 111 are IP devices that communicate with switch 110 using IP packets. Examples of devices 111 include a VoIP-enabled telephone, a VoIP-enabled conference phone, a software application providing VoIP services on a computer, such as a laptop or tablet computer, a video conferencing application, and the like. In some embodiments, switch 110 is a Media Gateway Controller (MGC) that includes SIP proxy server functionality as well as POTS switch functionality.

Switch 110 provides signaling functionality to devices 111, 112 to set up and tear down calls. With respect to POTS functionality, switch 110 may provide SS7 signaling or other appropriate signaling. With respect to VoIP functionality, switch 110 may provide SIP signaling or other appropriate signaling.

Switch 110 also includes transfer module 115, which provides the call transfer functionality described herein. In some examples, transfer module 115 includes a software application having computer executable code executed by one or more computers embodying switch 110. For instance, the switching functions of switch 110 may be provided by one or more server computers or dedicated switching hardware, where transfer module 115 is a part of the overall switching functionality.

Architecture 100 also includes packet switch 130, which serves packet communication devices 131. For example, switch 130 may include a SIP proxy server or other packet-based voice and/or video switch. Server 130 provides switching functionality to devices 131, which may include, e.g., smartphones, tablet computers, video conference devices, and the like.

Architecture 100 also includes TDM switch 120, which provides POTS switching for conventional TDM devices 121. Thus, network architecture 100 is a hybrid architecture that has both packet-based communications switching as well as conventional POTS switching. The hybrid nature of network architecture 100 poses challenges to conventional switches when transferring calls. However, as described herein, switch 110 and transfer module 115 provide workable solutions so that a callee in a transfer scenario sees Caller ID information for a correct party.

Figure 2:
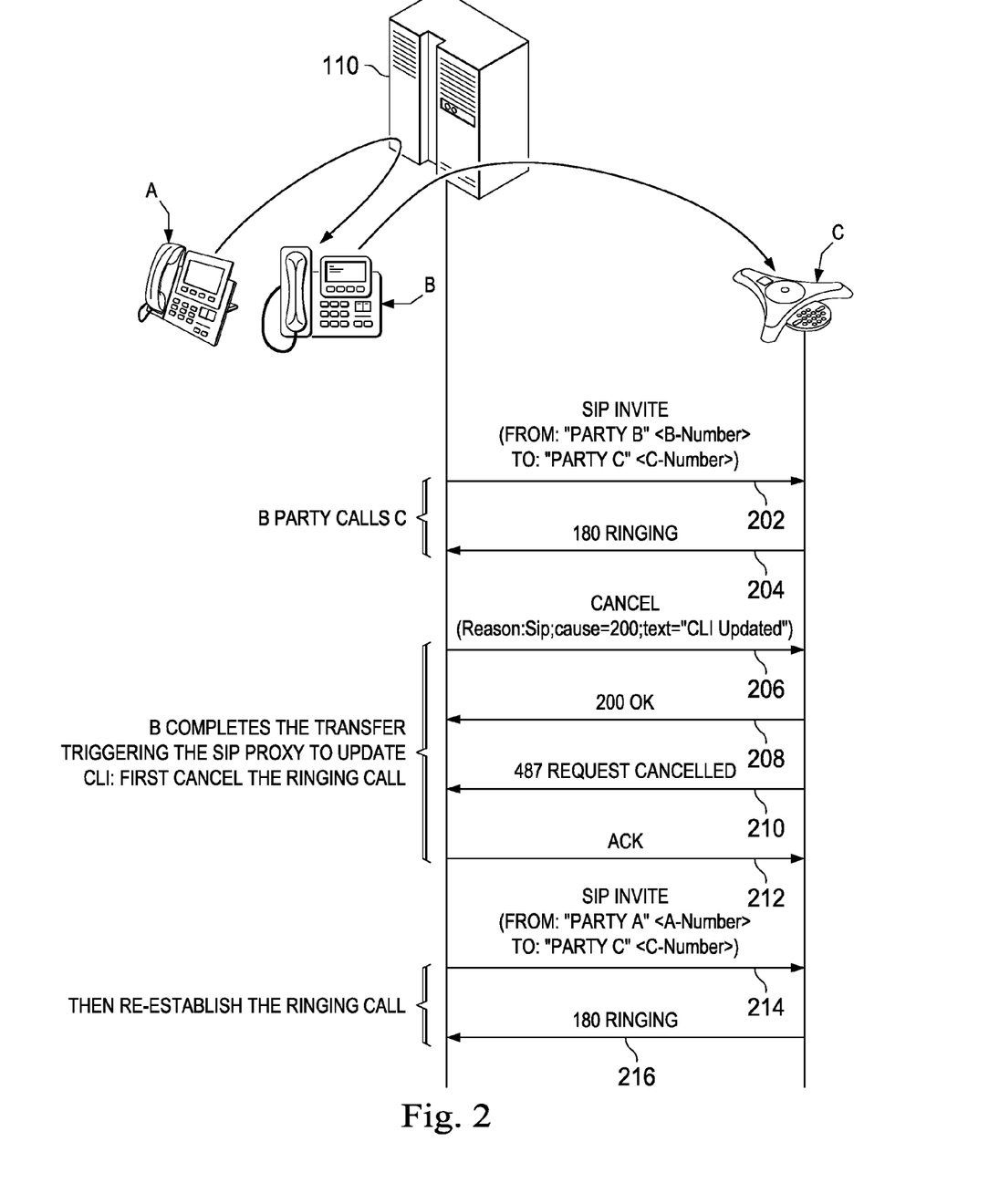
FIG. 2 is an example signal diagram showing an exchange of information between a switch and a party receiving a transferred call.

FIG. 2 is an example signal diagram showing an exchange of information between switch 110 and a party receiving a transferred call. FIG. 2 illustrates a blind transfer scenario. Keeping in mind the hybrid nature of architecture 100 of FIG. 1, party A is at any line/trunk supported on a switch and can be at a conventional TDM endpoint or a packet communication endpoint (e.g., a VoIP phone). Party B is at a SIP line on switch 110. Party C is at either a SIP line on switch 110 or a mobile on a Mobile Switching Center (MSC, not shown) which is connected to switch 110 via SIP with encapsulated ISUP (SIP-I). For purposes of this example, party A has called party B, and party B wishes to transfer the call to party C. Party B has put party A on hold and has requested that the call be transferred by sending a SIP REFER message (not shown) to switch 110, where the REFER message indicates that party C should receive the call.

At message 202, switch 110 sends a SIP INVITE message to party C in response to the transfer request from party B. The INVITE includes party B's CLI information. Message 204 indicates that the call to party C is ringing. As the call to party C is ringing, party C's display may provide party B's Caller ID information.

As the call is ringing, switch 110 then sends message 206 to cancel the ringing call. Message 206 includes a "reason", which is "cause=200." The particular reason and cause in the SIP CANCEL message 206 cause party C's device not to log the canceled call as a missed call. Messages 208-212 include party C confirming that the call has been canceled and switch 110 acknowledging message 210.

At message 214, switch 110 sends another INVITE, this time including CLI information of party A. Therefore, message 214 indicates that A is the calling party, and party C should see party A's Caller ID information. Message 216 is from the device of party C, and it indicates that the new call is ringing. FIG. 2 focuses on the call transfer functionality and does not include further call set-up. Following message 216, the new call from party A to party C is then set-up just as a conventional phone call from party A would be set up.

According to this example switch 110 has canceled a first call and then initiated a new call on behalf of party A. From the perspective of party C, the displayed Caller ID information first includes B's information and then includes A's information as the call is ringing. In some instances, the transfer is performed quickly so that party C is unaware that the first call was canceled and a new call initiated.

Figure 3:
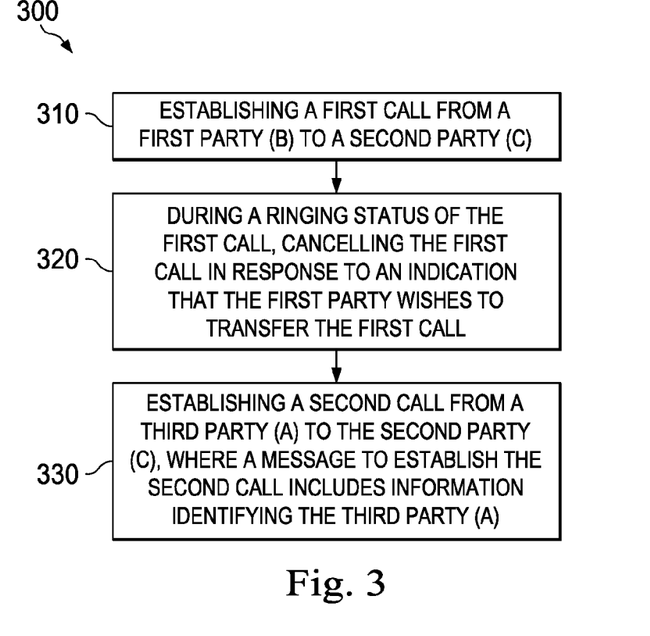
FIG. 3 is a simplified block diagram of example method, adapted according to one embodiment.

FIG. 3 is a simplified block diagram of method 300, adapted according to one embodiment. Method 300 may be performed by transfer module 115 of switch 110 of FIGS. 1 and 2. For instance, one or more computer devices providing switch functionality may read executable code from a non-transitory medium and then execute the code to perform the actions described below. Method 300 illustrates the blind transfer scenario of FIG. 2 and assumes that party A has called party B, party B has put party A on hold, and party B has sent a message to the switch instructing the call to be transferred to party C.

At action 310, the switch establishes a first call from the first party (B) to the second party (C). An example is shown in FIG. 2 at message 202, which includes a SIP INVITE with B's CLI information therein.

At action 320, switch 110 cancels the first call during a ringing status of the first call. In method 300, the request by party B to transfer the call to party C triggers switch 110 to perform the actions of the method to accomplish the transfer. Thus, the canceling of the first call is performed in response to the request by party B to transfer the call.

At action 330, switch 110 establishes a second call from the third party (A) to the second party (C), where a message to establish the second call includes information identifying the third party. An example is shown at FIG. 2, where switch 110 sends a SIP INVITE having party A's CLI information to party C. The call from party A to party C is then established.

Transfer module 115 may be programmed to recognize the multi-step blind transfer scenario and to perform actions 320 and 330 in response thereto. For instance, transfer module 115 may be programmed to recognize a call with party A on hold, a call with party C ringing and a REFER message from party B with party C's address as a multi-step blind transfer.

The scope of embodiments is not limited to the specific series of actions in method 300, as various embodiments may add, omit, rearrange, and/or modify actions. For instance, some embodiments may include preserving media attributes of the call from party A to party B. In one example, switch 110 saves some or all of the following information in local Random Access Memory (RAM) (or other appropriate memory): network address of party A, available codecs of A, and media portal information of A. Then, action 330 includes applying those preserved media attributes to the established call. For instance, SIP INVITE 214 may be generated to include the preserved media information. Therefore, the preserved media information may be used during negotiation and set-up of the second call. Preserving the media attributes may be performed in response to receiving the transfer request from party B.

Method 300 may also include identifying the logical terminating call model before the terminating features are encountered. This logical terminating call model has an entry point from where the termination requests to the subscriber start. This logical terminating model can be associated with multiple dialogs for multiple terminating devices. This logic terminating model provides an environment for terminating features to interact with each other. This method of CLI update operates in such logical terminating model starting from the entry point. A flag, e.g., cli-update, is introduced for the operation so that the other terminating features not related to the display update will not be affected. Only those features that interact with the display update will take action in some embodiments.

Figure 4:
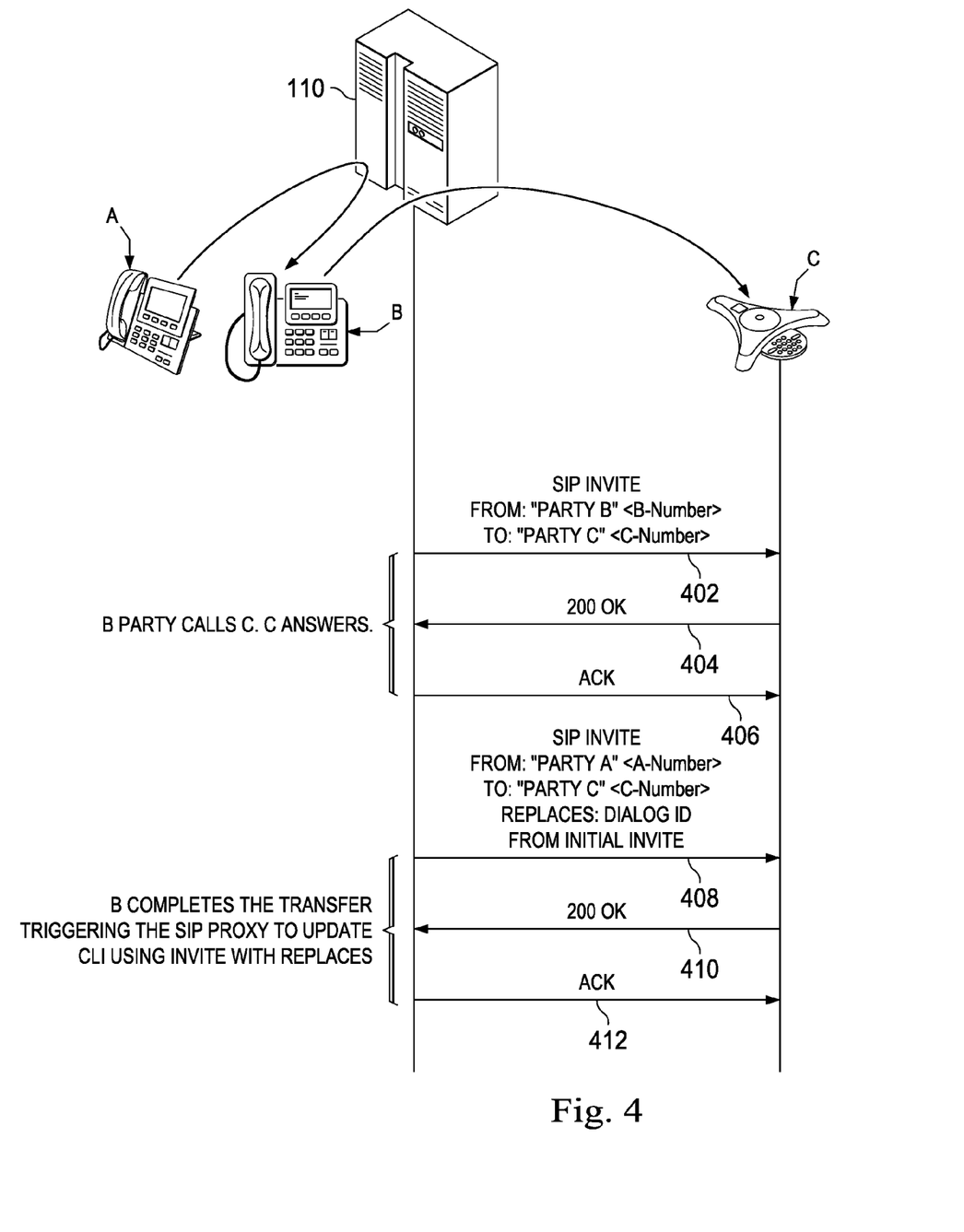
FIG. 4 is an example signal diagram showing an exchange of information between a switch and a party receiving a transferred call.

Various embodiments also include solutions for consultative transfer scenarios. FIG. 4 is an example signal diagram showing an exchange of information between switch 110 and a party receiving a transferred call. As with FIG. 2, party A is at any line/trunk supported on a switch and can be at a conventional TDM endpoint or a packet communication endpoint (e.g., a VoIP phone). Party B is at a SIP line on switch 110. Party C is at either a SIP line on switch 110 or a mobile on a MSC (not shown) which is connected to switch 110 via SIP-I. For purposes of this example, party A has called party B, and party B wishes to transfer the call to party C. Party B has put party A on hold.

Party B then calls party C by entering party C's network address (e.g., a phone number of SIP ID). In response, switch 110 sends INVITE message 402 to party C's device. Message 402 includes party B's CLI information, so that party C's device displays party B's Caller ID information. Message 404 includes an OK message, and message 406 includes an acknowledgement by the switch. At this point, switch 110 has established a call from party B to party C, and party C has answered the call from party B. There is an ongoing media conversation between parties B and C. The call between parties A and B is still on hold.

Although not shown in FIG. 4, Party B has requested that the call with party A be transferred by sending a REFER message (not shown) to switch 110, where the REFER message indicates that party C should receive the call. In response to the transfer request, switch 110 sends a second INVITE at message 408. Message 408 includes instructions for party C's device to replace the existing dialog of the B-C conversation with a new dialog for an A-C conversation. Specifically, message 408 includes a "replaces" header that acts as an instruction for party C's device to replace the CLI information of party B with that of party A. The B-C conversation has a dialog, which is a set of information including at least a FROM field, a TO field, and a call ID. The call ID is a number that uniquely identifies the B-C call. In the present example, the Replaces header includes instructions to replace the FROM field information (that has party B's CLI information) with party A's CLI information.

Party C's device replaces the information discussed above and sends message 410 to switch 110. Switch 110 responds with acknowledgment message 412. Although not shown here, parties A and C then set up communication within the call by negotiating, e.g., codecs, and then exchanging media as in a conventional call. The A-C call is not a different call, but rather, is the same call as between parties B and C and uses the same call ID.

Figure 5:
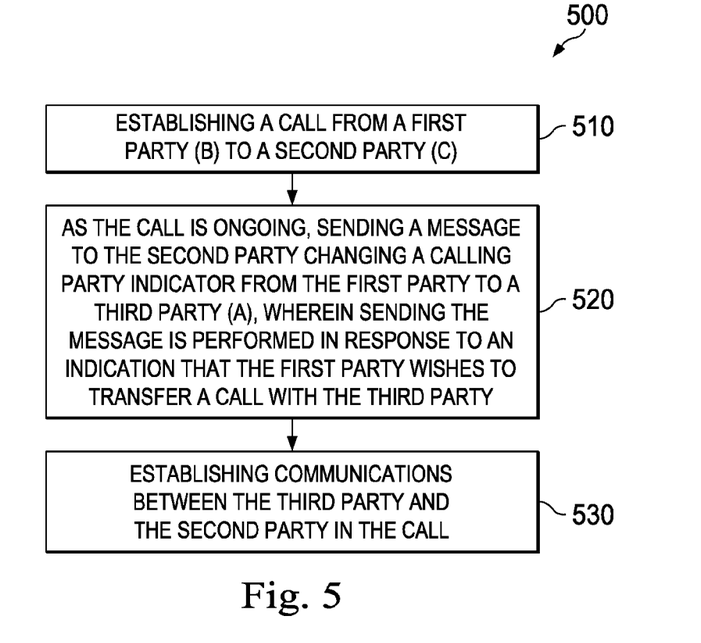
FIG. 5 is a simplified block diagram of example method, adapted according to one embodiment.

FIG. 5 is a simplified block diagram of method 500, adapted according to one embodiment. Method 500 may be performed by transfer module 115 of switch 110 of FIGS. 1 and 4. For instance, one or more computer devices providing switch functionality may read executable code from a non-transitory medium and then execute the code to perform the actions described below. Method 500 illustrates the consultative transfer scenario of FIG. 4 and assumes that party A has called party B, and party B has put party A on hold.

At action 510, switch 110 establishes a call from party B to party C in response to a request by party B to call party C. An example of action 510 is shown in FIG. 4 at messages 402-406. Action 510 results in an ongoing media exchange between parties B and C as the call between A and C is still on hold.

Party B then requests to transfer party A to communicate with party C. At action 520, as the call is ongoing, switch 110 sends a message to party C changing a calling party indicator from party B to a party A. An example is shown at message 408 of FIG. 4 in which switch 110 sends a SIP INVITE message with a Replaces header that causes party C's device to replace party B's address in the call dialog with party A's address. Action 520 is performed in response to the transfer request by party B.

At action 530, switch 110 establishes communications between the third party and the second party in the call. In this example, the switch 110 facilitates the communications by passing messages during negotiation and set-up. The result of method 500 is that parties A and C are in the same call that previously was between parties B and C.

Transfer module 115 may be programmed to recognize the consultative transfer scenario and to perform actions 520 and 530 in response thereto. For instance, transfer module 115 may be programmed to recognize a call with party A on hold, a call with party C ongoing and a REFER message from party B with party C's address as a consultative transfer.

The scope of embodiments is not limited to the specific series of actions in method 500, as various embodiments may add, omit, rearrange, and/or modify actions. For instance, some embodiments may include preserving media attributes of the call from party A to party B, where A has been put on hold. Similar to the action noted above with respect to method 300 of FIG. 3, switch 110 may save some or all of the following information in local RAM: network address of party A, available codecs of A, and media portal information of A. Then, action 520 includes applying those preserved media attributes to the established call. For instance, INVITE 408 may be generated to include the preserved media information. Therefore, the preserved media information may be used during negotiation and set-up of communications between parties A and C. Preserving the media attributes may be performed in response to receiving the transfer request from party B. Furthermore, switch 110 may also identify the local terminating call model before the terminating features are encountered.

Figure 6:
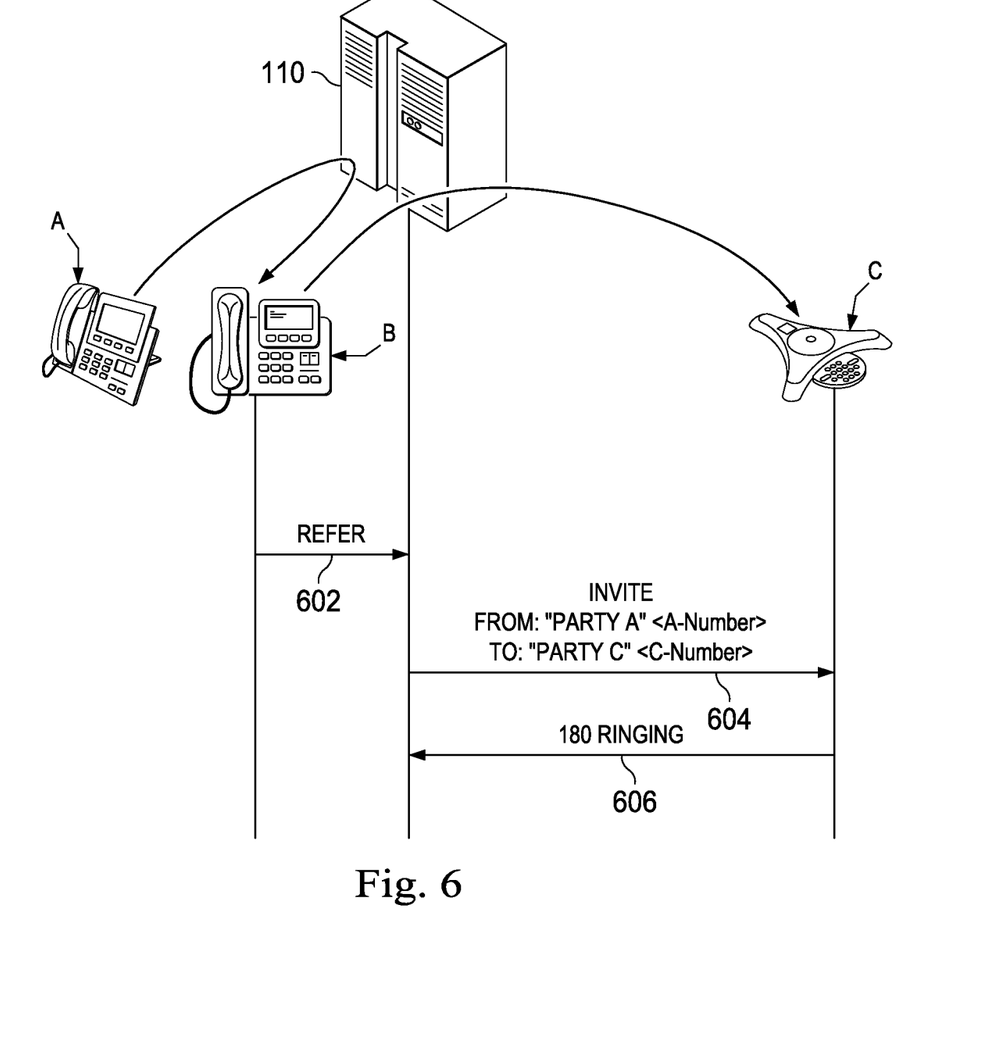
FIG. 6 is an example signal diagram showing an exchange of information between a switch and a party receiving a transferred call in a single step blind transfer scenario.

FIG. 6 is an example signal diagram showing an exchange of information between switch 110 and a party receiving a transferred call in a single step blind transfer scenario. Once again, party A may be at any line/trunk supported on a switch and can be at a conventional TDM endpoint or a packet communication endpoint (e.g., a VoIP phone). Party B is at a SIP line on switch 110. Party C is at either a SIP line on switch 110 or a mobile on a MSC (not shown) which is connected to switch 110 via SIP-I.

For purposes of this example, party A has called party B, and party B wishes to transfer the call to party C. Party B has put party A on hold. A difference between the embodiments of FIGS. 2 and 4 and the embodiment of FIG. 6 is that the embodiment of FIG. 6 does not include a call between parties B and C. At message 602 party B has requested that the call be transferred by sending a REFER message to switch 110, where the REFER message indicates that party C should receive the call.

In response to the message 602, switch 110 generates message 604, which in this example includes an INVITE that has party A's address in the FROM filed. In other words, switch 110 presents A's CLI information in a call request to party C as if the call request had come from party A. At message 606, party C's device indicates that it is ringing. Party A, party C, and switch 110 then set up the call and negotiate so as to result in media communications between parties A and C. After message 606, the call from party A to party C can be set up as with a conventional call. There is no ongoing call between parties B and C.

Figure 7:
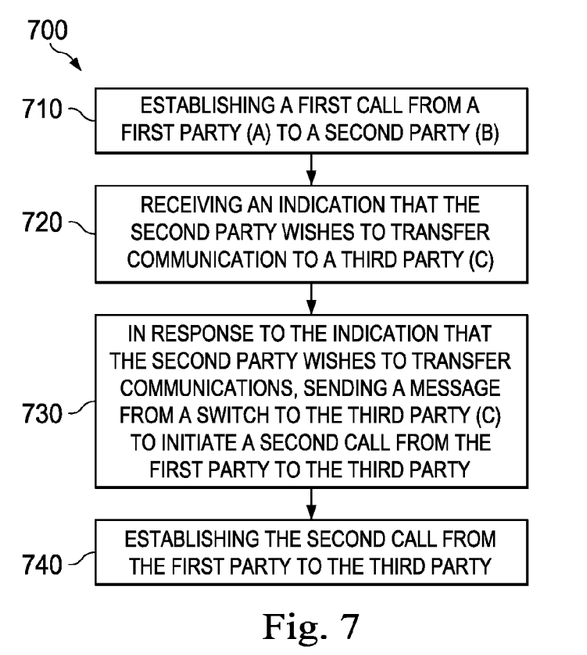
FIG. 7 is a simplified block diagram of example method, adapted according to one embodiment.

FIG. 7 is a simplified block diagram of method 700, adapted according to one embodiment. Method 700 may be performed by transfer module 115 of switch 110 of FIGS. 1 and 6. For instance, one or more computer devices providing switch functionality may read executable code from a non-transitory medium and then execute the code to perform the actions described below. Method 700 illustrates the single-step blind transfer scenario of FIG. 6.

At action 710, switch 110 establishes a first call from party A to party B. The first call may be established as conventional calls are currently established. Action 710 results in an ongoing media exchange between party A and party B. Party B then puts party A on hold.

At action 720, switch 110 receives an indication that party B wishes to transfer communication to party C. In one example, party B's SIP phone has a user interface to transfer an active call to party C in a single step, e.g., pressing a "transfer" button and specifying party C's address (e.g., a telephone number or SIP ID). Once party C's address is entered, then party B's SIP device sends a REFER message with party C's address to switch 110. Party B is automatically released without hearing the C party ringing.

At action 730, switch 110 sends a message to party C to initiate a second call from party A to party C. Action 730 is performed in response to the transfer request of action 720. In the example of FIG. 6, the message includes a SIP INVITE having party A's address in the FROM field and having party C's address in the TO field. At action 740, switch 110 establishes the second call from the party A to party C by facilitating set-up and negotiation. Thus, actions 730 and 740 result in a new second call, from party A to party C without the participation of party B. The second call is a separate call, set up on behalf of party A, and in response to the transfer request by party B.

Transfer module 115 is programmed to recognize the sing-step blind transfer. For instance, receiving a REFER message from party B when party B has party A on hold and receiving party C's address with the REFER message is recognized as a trigger to initiate the second call as in actions 730 and 740.

The scope of embodiments is not limited to the specific series of actions in method 700, as various embodiments may add, omit, rearrange, and/or modify actions. Similar to methods 300 and 500 (FIGS. 3 and 5), some embodiments may include preserving media attributes of the call from party A to party B. In one example, switch 110 saves network address of party A, available codecs of A, and/or media portal information of A in local RAM. Then, action 730 includes applying those preserved media attributes to the second call. For instance, SIP INVITE 604 may be generated to include the preserved media information so that the preserved media information is used during negotiation and set-up of the second call. Preserving the media attributes may be performed in response to receiving the transfer request from party B. Method 700 may also include identifying the logical terminating call model before the terminating features are encountered With respect to saving media attributes, each of methods 300, 500, and 700 may include techniques to respect privacy of party A if party A has a privacy status (e.g., has requested its displayed Caller ID information not to include A's name or address). In some embodiments, the CLI update includes calculating party A's CLI information based on how the original A-B call was created. The privacy settings of A party should ideally be honored. In many instances, switch 110 has name, number, or both for party A. If the call A-B call is established by B calling A, special attention can be paid to A's privacy status since the switch may not have A's privacy status, in which case the privacy status is set to "restricted" and party A's information is not presented to party C The various embodiments above present the call to party C as if party A is making a call to party C. Switch 110 puts party A's CLI information (name, number or both) with privacy status if available in the call set up request to party C. Party A's Caller ID information is then displayed on party C's device unless party A's privacy status prohibits it.

Another issue common to the various embodiments above is billing. In most instances, it is assumed that party B should be billed for the transferred call that is set up between parties A and C. However, if party A's CLI information is included in the FROM field of the INVITE message, then as a default party A will be billed for the call. Thus, some embodiments further include identifying party B in the billing header when appropriate.

Various embodiments may include one more advantages over previous solutions. Some embodiments make use of different strategies for CLI update based on how the call transfer feature is invoked. SIP mechanism like REFER, REPLACES header, and CANCEL have been previously established. But the usage of these mechanisms for mid-call CLI update for featured call scenarios in a hybrid environment with both TDM lines and VoIP lines is new. For example, TDM endpoints typically do not understand REFER messages, but some techniques described above enable switch 110 to represent the TDM endpoints and participate in the SIP dialog and cause the C party endpoint to update the display correctly as if the TDM endpoints understand REFER. In other words, in each of the scenarios described above, party C should be able to see party A's Caller ID information if party A does not have a privacy setting specifying otherwise.

Therefore, various embodiments described above provide seamless class 5 transformations with correct CLI updates for featured call scenarios as well as basic call scenarios, for both TDM endpoints and VoIP endpoints. Also, the embodiments described above can be implemented by adding transfer functionality to switching equipment rather than modifying user or customer equipment. For example, the various embodiments include Access Gateway Control Function (AGCF) which controls TDM endpoints on one side and signals SIP on the other. Some of the techniques described in this method can be used as well, e.g., single step blind transfer by the AGCF line (the B party) can include the A party's CLI info in the CLI presentation fields (e.g., FROM header) in outgoing INVITE to party C with B party info in the p-asserted-identity header for authentication and billing purposes. Various embodiments include applying the principles discussed above to other VoIP technologies, such as H.323, Media Gateway Control Protocol (MGCP), Network-based Call Signaling (NCS) and H.248.

Figure 8:
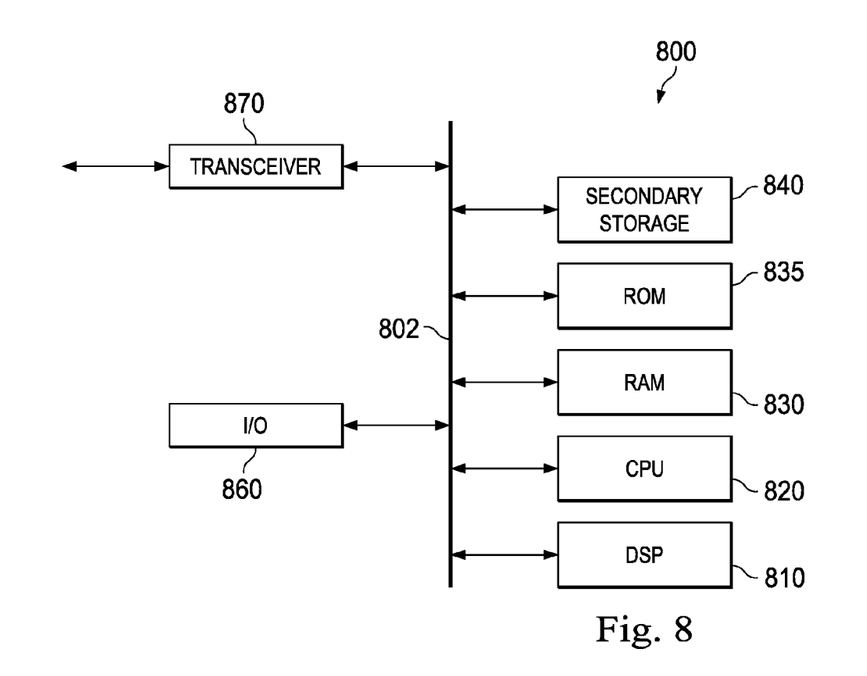
FIG. 8 illustrates an example computer system adapted according to one embodiment of the present disclosure.

FIG. 8 illustrates an example computer system 800 adapted according to one embodiment of the present disclosure. The computer system 800 includes an example system on which embodiments of the present disclosure may be implemented (such as switch 110). The computer system 800 includes a digital signal processor (DSP) 810, a central processing unit (CPU) 820, a random access memory (RAM) 830, a read-only memory (ROM) 835, secondary storage 840, input/output (I/O) devices 860, and a of transceivers 870, all of which may be communicatively coupled via a bus 802.

The CPU 820 may be implemented using hardware or a combination of hardware and software. Although illustrated as a single CPU, the CPU 820 is not so limited and may comprise multiple processors. The CPU 820 may be implemented as one or more processors, i.e., as one or more chips, cores (e.g., a multi-core processor), field-programmable gate arrays (FPGAs), and/or application specific integrated circuits (ASICs). Likewise, the DSP 810 may be implemented as more than one DSP chip.

The secondary storage 840 may comprise one or more disk drives or solid state drives and is used for non-volatile storage of data and as an over-flow data storage device if the RAM 830 is not large enough to hold all working data. The RAM 830 may be static RAM, dynamic RAM, or the like, and the ROM 835 may be programmable ROM (PROM), erasable PROM (EPROM), electrically EPROM (EEPROM), or the like. The secondary storage 840 may be used to store programs that are loaded into the RAM 830 when such programs are selected for execution. The ROM 835 is used to store instructions and perhaps data that are read during program execution. The ROM 835 is a non-volatile memory device that typically has a small memory capacity relative to the larger memory capacity of the secondary storage. The RAM 830 is used to store volatile data and perhaps to store instructions. Access to both the ROM 835 and the RAM 830 is typically faster than to the secondary storage 840.

The computer system 800 includes transceivers 870. There may be a transceiver 870 for each communication line (e.g., electrical or optical) coupled to the computer system 870. A transceiver 870 may be bidirectional or unidirectional, depending on the embodiment. Each transceiver 870 is adapted to couple computer system 800 to a communication link (e.g., a wired or wireless communication link). In the examples of FIGS. 1 and 3, transceivers 870 may couple switch 110 to endpoint devices and/or other switches.

The I/O devices 860 may include a keyboard, a computer mouse, a microphone, and/or a display device for allowing a user to provide input to and receive output from the computer system 800.

It is understood that by programming and/or loading executable instructions onto the computer system 800, at least one of the CPU 820, the RAM 830, and/or the secondary storage 840 are changed, transforming the computer system 800 in part into a particular machine or apparatus having the functionality taught by the present disclosure. The executable instructions may be stored on the RAM 830 or secondary storage 840 and loaded into the CPU 820 for execution. The device functionality described above with respect to FIGS. 1-7 may be implemented as a software application running on the CPU 820 and using the RAM 830, the ROM 835, and/or secondary storage 840. Specifically, for MGC 110, its functions described at FIG. 1-7 may be implemented as a software application running on the CPU 820.

Logic may be encoded in a non-transitory computer-readable medium, such as RAM 830 and/or secondary storage 840. Such a medium can take many forms, including but not limited to, non-volatile media and volatile media. In various implementations, non-volatile media includes optical or magnetic disks, such as secondary storage 840, and volatile media includes dynamic memory, such as various types of RAM 830. CPU 820 reads application code from the readable medium and executes the code to provide the described functionality.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
establishing a first call from a first party to a second party;
during a ringing status of the first call, cancelling the first call in response to an indication that the first party wishes to transfer the first call; and
establishing a second call from a third party to the second party, where a message to establish the second call includes information identifying the third party;
wherein the method is performed by a Session Initiation Protocol (SIP) proxy server, further wherein the second party is at a non-Session Initiation Protocol (SIP) endpoint and wherein the first party is at a Voice over Internet Protocol (VoIP) endpoint, the non-SIP endpoint including at least one of a Time Divisional Multiplexing (TDM) endpoint, and H.323 endpoint, a Media Gateway Control Protocol (MGCP) endpoint, a Network-based Call Signaling (NCS) endpoint, and a H.248 endpoint.

2. The method of claim 1, wherein a message to establish the first call includes information identifying the first party.

3. The method of claim 1, wherein a message to cancel the first call includes information to cause a phone of the second party to omit adding the first call to a missed call log.

4. The method of claim 1, further comprising:
preserving media attributes of a call from the third party to the first party, where the call from the third party to the first party is placed on hold by the first party.

5. The method of claim 4, wherein the media attributes include at least one of:
a network address of the third party;
media portal information for the third party; and
available codecs for third party.

6. The method of claim 4, wherein establishing the second call comprises:
    applying the preserved media attributes to the second call.

7. The method of claim 1, further comprising holding a communication between the third party and the first party during the canceling.

8. The method of claim 1, wherein transferring the first call is performed in response to receiving a Session Initiation Protocol (SIP) REFER message from the second party.

9. A method comprising:
    establishing a first call from a first party to a second party;
    as the first call is ongoing, sending a message to the second party changing a calling party indicator from the first party to a third party, wherein sending the message is performed in response to an indication that the first party wishes to transfer the first call to the third party; and
    establishing communications between the third party and the second party;
    wherein the method is performed by a Session Initiation Protocol (SIP) proxy server, further wherein the second party is at a non-Session Initiation Protocol (SIP) endpoint and wherein the first party is at a Voice over Internet Protocol (VoIP) endpoint.

10. The method of claim 9, wherein sending a message changing the calling party indicator comprises:
    sending a Session Initiation Protocol (SIP) INVITE message from the SIP proxy server to the second party as the first call is ongoing, the SIP INVITE message including a replacement header that includes calling party information of the third party in lieu of calling party information of the first party.

11. The method of claim 9, further comprising:
    holding a second call between the third party and the first party during the first call.

12. The method of claim 9, wherein the non-SIP endpoint includes at least one of a Time Divisional Multiplexing (TDM) endpoint, and H.323 endpoint, a Media Gateway Control Protocol (MGCP) endpoint, a Network-based Call Signaling (NCS) endpoint, and a H.248 endpoint.

13. The method of claim 9, further comprising:
    preserving media attributes of a second call from the third party to the first party, where the second call is placed on hold by the first party.

14. The method of claim 13, wherein the media attributes include at least one of:
    a network address of the third party;
    media portal information for the third party; and
    available codecs for third party.

15. The method of claim 13, wherein establishing communications comprises:
    applying the media attributes to communications between the third party and the second party in the first call.

16. A method comprising:
    establishing a first call from a first party to a second party;
    receiving an indication that the second party wishes to transfer the first call to a third party;
    in response to the indication that the second party wishes to transfer the first call, sending a message from a switch to the third party to initiate a second call from the first party to the third party; and
    establishing the second call from the first party to the third party;
    wherein the message includes information identifying the first party, further wherein the second party is at a non-Session Initiation Protocol (SIP) endpoint and wherein the first party is at a Voice over Internet Protocol (VoIP) endpoint.

17. The method of claim 16, wherein the non-SIP endpoint includes at least one of a Time Divisional Multiplexing (TDM) endpoint, and H.323 endpoint, a Media Gateway Control Protocol (MGCP) endpoint, a Network-based Call Signaling (NCS) endpoint, and a H.248 endpoint.

18. The method of claim 16, wherein the indication that the second party wishes to transfer the first call comprises a Session Initiation Protocol (SIP) REFER message, and further wherein the message from the switch to the third party comprises a SIP INVITE initiating the second call from the first party to the third party.

* * * * *